(12) United States Patent
Hirakawa

(10) Patent No.: US 6,586,920 B1
(45) Date of Patent: Jul. 1, 2003

(54) LIGHTNING DETECTOR

(76) Inventor: Yoshihiro Hirakawa, 2-29-10 Nakano, Aki-ku, Hiroshima-shi (JP)

( * ) Notice: Subject to any disclaimer, the term of this patent is extended or adjusted under 35 U.S.C. 154(b) by 273 days.

(21) Appl. No.: 09/689,816

(22) Filed: Oct. 13, 2000

(30) Foreign Application Priority Data

Oct. 15, 1999 (JP) ............................................. 11-294020

(51) Int. Cl.⁷ ................................................ G01W 1/00
(52) U.S. Cl. ...................................... 324/72; 324/76.19
(58) Field of Search ................................. 324/72, 158.1, 324/133, 658, 765, 76.19; 340/600, 601, 522, 961; 250/209, 214

(56) References Cited

U.S. PATENT DOCUMENTS

| | | | |
|---|---|---|---|
| 3,790,884 A | * | 2/1974 | Kohl ............................ 324/72 |
| 4,276,576 A | * | 6/1981 | Uman et al. ................... 324/72 |
| 4,897,538 A | * | 1/1990 | Lemaire et al. ............. 250/209 |
| 5,057,820 A | * | 10/1991 | Markson et al. ............... 324/72 |

* cited by examiner

*Primary Examiner*—Ernest Karlsen
*Assistant Examiner*—Jimmy Nguyen
(74) *Attorney, Agent, or Firm*—McGinn & Gibb, PLLC

(57) ABSTRACT

A lightning detector featuring improved reliability over the conventional radar-type or coherer-type lightning detector that measures the intensity of static electricity or the intensity of electromagnetic waves, includes a coherer with an automatically restoring decoherer. The coherer is equipped with a separate coherer for a lightning circuit. The lightning detector detects and operates the (static) position and/or approaching/separating condition (dynamic) data of the thundercloud while protecting its own circuit.

20 Claims, 14 Drawing Sheets

LIGHTNING DETECTOR

BACKGROUND OF THE INVENTION

1. Field of the Invention

The Present invention relates to a lightning detector and, more specifically, to a lightning detector by utilizing the characteristics of a coherer equipped with a decoherer

2. Description of the Related Art

There have heretofore been put into practice or proposed a variety of lightning detectors which can roughly be classified into (1) those without using a coherer and (2) those using a coherer.

Some devices pertaining to (1) uses ① a lightning wire of, for example, a high-tension transmission line. In this case, however, the detector line (lightning wire) inevitably becomes lengthy for maintaining a precision for detecting the potential relative to ground, and the detector line itself is subject to be destroyed by a thunder-bolt.

There has further been proposed a method or a device ② which confirms the presence of a thundercloud based upon the data from a so-called meteorological radar (cloud radar) to estimate the degree of danger accompanied thereby. However, the device becomes expensive though the reliability is not so high. Concerning the method or the device ②, it has been attempted to render an overall judgement by taking into consideration the data obtained from artificial satellites and telemeter-measured values of precipitation without, however, satisfactory results.

Further, ③ a device, SKYSCAN (™), taught in U.S. Pat. No. 5,541,501 has been placed in the market in the U.S.A. and in other countries. This is a lightning detector which displays the distance from the lightning position by comparing and analyzing the frequency and intensity of electromagnetic waves due to lightning.

As the manual of the product states "BE AWARE THAT STORMS CAN FORM DIRECTLY OVER YOUR LOCATION, OFFERING LITTLE OR NO ADVANCE WARNING EVEN WHEN USING A SKYSCAN", however, this device is not capable of detecting lightning just overhead, and it Lust be said that its reliability is very low.

The method or the device (2) was developed based on the re-discovery that the coherer sharply reacts to a change in the intensity of the electromagnetic field inclusive of the static electric field, and there have been proposed many variations as taught in, for example, ④ Japanese Unexamined Patent Publication (Kokai) No. 50154/1996, ④ Japanese Unexamined Patent Publication (Kokai) No. 180911/1997 and ⑤ U.S. Pat. No. 5,399,962. However, the device of the publication ④ is often affected by alternating electric field noise from, for example, a high-tension transmission line, by the modulated carrier waves of broadcast or communication and, particularly, by PWM (pulse width modulated) intermittent wave noises, and, hence, malfunctions, accounting for a major cause of inhibiting the widespread use as the lightning detector with coherer.

The device of the publication ⑤ is a highly sensitive coherer having a low self-operation voltage (threshold voltage), which is very effective in detecting a very weak spark discharge. This device, however, is rather cumbersome to use for the spontaneous aerial discharge of large electric power such as of thunder discharge (lightning). This device has not been proposed for detecting lightning and, besides, involves a problem in practice.

The device of the publication ⑥ is a surge protector for a high-tension transmission line and uses a coherer. This device detects damped wave disturbances but is not designed for detecting lightning. The damped wave disturbances are caused by spark discharge due to a thunder-bolt or a short-circuit (abnormal discharge inclusive of arc discharge or corona discharge caused by salt damage). The device of the publication ⑥ has been designed for detecting abnormal conditions on the high-tension lines.

That is, the coherer has wide frequency characteristics and exhibits a considerable degree of sensitivity even for artificial spark discharge noise. The frequency spectrum of artificial spark discharge noise exists chiefly in a high-frequency region of about 1 Mhz or higher. On the other hand, the electromagnetic waves of lightning discharge have low frequencies in the regions of from VLF to MF. According to the prior art, the frequencies could not be distinguished. Since high-frequency noises were easily picked up, the sensitivity to the electromagnetic waves of lightning became relatively low.

With the conventional techniques ① to ③ and ④ to ⑥, it is difficult to reliably detect the intensity of the electromagnetic waves of not smaller than a predetermined value caused by thunder-bolt.

There has not yet been known a lightning detector equipped with a lightning circuit for protecting itself and with a coherer, capable of detecting thunder that is approaching or is separating way.

SUMMARY OF THE INVENTION

The present inventors, therefore, have accomplished a lightning detector capable of more correctly detecting lightning by incorporating a lightning circuit having a low-pass filter (hereinafter often abbreviated as LPF or is often called "filter transformer") and/or an aerial discharge gap between the antenna and the coherer, to offer the function of detecting thunder that is approaching or is separating away.

It is therefore an object of the present invention to provide a lightning detector which is capable of reliably predicting lightning free from the danger of being struck by lightning by using a relatively simply constructed coherer with a decoherer.

Another object of the present invention is to alert the degree of danger of lightning by using an indicator by detecting and storing lightning data and thunder data of a plurality of thunder-bolts at a distance, and by comparing at least two pairs of these data.

A further object of the present invention is to produce an indication/alarm by statically detecting the fact that the lightning detector is approaching the lightning range and/or by dynamically detecting whether the thunder-bolt is approaching/moving away.

The invention provides a lightning detector comprising an antenna, a coherer with a decoherer, a low-pass filter installed between the antenna and the coherer, an indicator and a power source, the lightning detector detecting the intensity of impulse electromagnetic waves of not smaller than a predetermined value produced by a thunder-bolt outside the lightning range, and producing an indication and/or an alarm on an indicator to tell that the detector is approaching the lightning range.

The invention provides a lightning detector as met forth above 1, wherein the coherer comprises one filled with metal particles or metal particles coated with an oxide film between a pair of electrodes in an insulating tube that is sealed, and the decoherer comprises one that gives mechanical vibration to the coherer from the external side.

The invention provides a lightning detector as set forth above, wherein the coherer is equipped with a lightning circuit capable of adjusting the aerial discharge gap.

The invention provides a lightning detector as set forth above, wherein the lightning circuit is equipped with an exclusive coherer (coherer No. 2) for the lightning circuit, separate from the coherer (coherer No. 1) for the alarm.

The invention further provides a lightning detector as set forth above, wherein a plurality of thunderbolts stronger than a predetermined level are measured and recorded as electromagnetic wave intensity difference ΔEn and sound pressure difference ΔPn, the moments of inputs of these signals are stored in a storage medium in time series, a red lamp is turned on when a gradient of time difference ΔTn of ΔEn and ΔPn of when a pair of electric signal and sound signal are input, is (−) over a time of at least m pairs (m is a positive integer), a yellow lamp is turned on when the gradient of time difference ΔTn is close to (0) and a green lamp is turned on when the gradient of time difference ΔTn is (+), to indicate the danger of a thunder-bolt.

The invention will now be described in detail.

Lightning emits electromagnetic waves of countless frequencies which are distributed in a relatively low range (VLF to MF bands).

The field intensities of the electromagnetic waves of these frequencies can be detected in a synthesized form. Since the intensities of electromagnetic fields of various frequencies sharply change with the passage of time, the intensity of the electromagnetic field that is detected usually changes sharply.

It has been known that in a typical lightning discharge, the intensity of the electromagnetic field changes as much as 120 V/m at the greatest 100 μS as measured at a point 20 Km away from the point where the discharge is taking place (as calculated from a maximum waveform of main discharge, H. Norinder, Handbook of Wireless Engineering, 10, Chapter 6, 10–69, FIG. 10-94: Lightning Discharge waveform, Ohm Co., May 25, 1964).

Such a sharp and large change in the intensity of the electromagnetic field is unthinkable in the artificial electromagnetic waves that are used in the daily broadcasts and communications. In fact, however, the coherer reacts to a sharp and large change in the electric field intensity. In fact, a coherer that was fabricated for testing favorably reacted to a change in the field intensity of 60 V/m in 100 μS (in an electric field due to artificial spark discharge).

The coherer, in contrast, is very insensitive and does not react to electromagnetic waves of a predetermined field intensity that is accompanied by a mild change in the electromagnetic field intensity. It was confirmed that the coherer fabricated for testing did not react even under a predetermined electromagnetic field of 10 V/m (such an electromagnetic field intensity is very larger than those that are usually used).

The present inventors have re-discovered such characteristic properties of the coherer, and have applied such properties to the lightning detector and have further added some contrivances.

In the coherer fabricated for testing, a mixture powder of Ni and Ag (95% by weight of Ni, 5% by weight of Ag, the particles having an average diameter of about 100 to 1500 μm) was sandwiched by Ag electrodes, and was sealed in a glass tube together with the dry air.

The coherer comprises particles of a single metal such as Ni, Co, Fe, Mn, Zn, Cu, Ag, Au, Pd, Al or Pt or mixture particles thereof that are filled in a fluidizing manner in an insulating tube such as of ebonite, glass or plastic, and a pair of electrodes are provided at both ends of the insulating tube. Usually, the surfaces of these metal particles are covered with an oxide film having a low electrically conducting property. Therefore, the contact resistance is so large that no current flows across both terminals.

In the case of a stable metal such as Au or Pt, the effect of the oxide film is small and a generally good electrically conducting property is exhibited. Therefore, the initial insulating property is maintained due to gaps among the particles and the lowly electrically conducting substance such as silicone oil that is added. When an impulse voltage due to lightning is applied across both terminals, the metal particles in the coherer are destroyed for their insulation and are cohered to conduct the electricity.

The decoherer is a device for recovering the insulating property of the coherer that is cohered. In its most primitive form, the glass tube is hit by hand using a wood hammer or a plastic hammer. This, however, may be automatically carried out by mechanically vibrating the glass tube relying upon ultrasonic waves (20 KHz or higher) generated by a piezo-electric element or an electromagnet after every predetermined period of time.

The dynamic detector means accomplishes dynamic detection only independently of the static detection, and could become an effective lightning detector means for indicating danger (see embodiment 4). That is, there exists an invention in the dynamic detector means itself.

Concerning other respects, the invention will be described in further detail with reference to the embodiments below.

DESCRIPTION OF THE PREFERRED EMBODIMENTS

Embodiment 1

Figure 1:
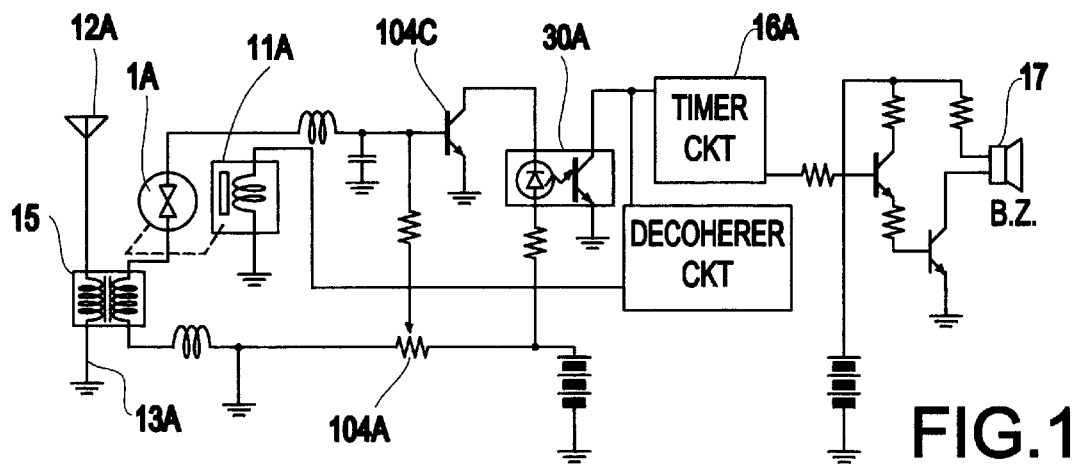
FIG. 1 is a circuit diagram of a first embodiment of the present invention.
Figure 2:
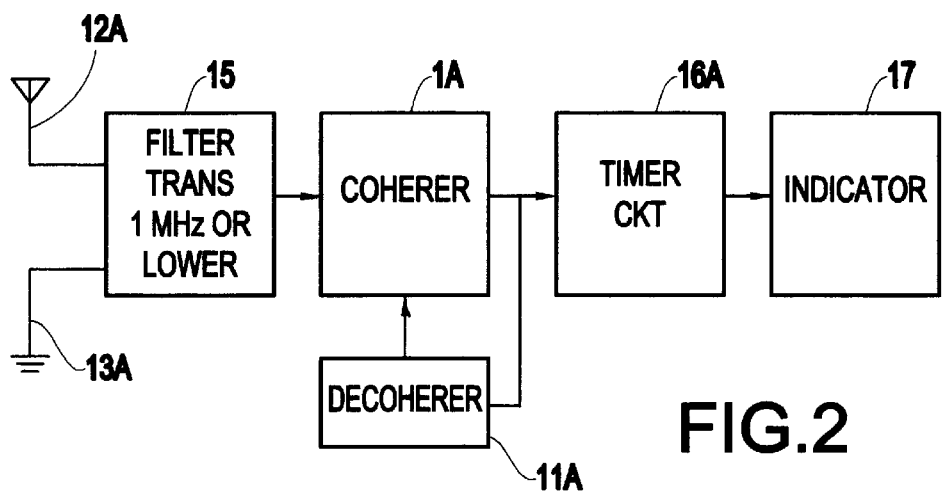
FIG. 2 is a block diagram of the circuit of FIG. 1.

Described below is an embodiment 1 of the present invention of claim 2. FIG. 1 is a circuit diagram of the present invention and FIG. 2 is a block diagram thereof, wherein reference numeral 12A denotes an antenna No. 1 for trapping electromagnetic waves generated by a thunder-bolt, 13A denotes earth, 1A denotes a coherer No. 1 for detecting electromagnetic waves due to lightning, 15 denotes a filter transformer (a kind of low-pass filter, the same holds hereinafter) which removes ranges other than the frequency range of the electromagnetic waves due to lightning and insulates an alarm circuit and the antenna 12A No. 1 from each other, 104C denotes a transistor which operates according to a change in the voltage applied to the coherer 1A No. 1, reference numeral 104A denotes a variable resistor for adjusting a bias voltage applied to the transistor 104C, reference numeral 11A denotes a decoherer No. 1 which vibrates the coherer No. 1 to decohere it, 17 denotes an indicator that indicates an alarm, and 16A denotes a timer which transmits the detection of lightning to the indicator 17 for a predetermined period of time.

The electromagnetic waves of lightning trapped by the antenna No. 1 12A are transmitted to the coherer No. 1 through the filter transformer 15. The filter transformer absorbs electromagnetic waves of frequencies higher than about 1 MHz. Namely, the frequency components of the electromagnetic waves are selected. The filter transformer also plays the role of protecting the coherer from induced lightning which is a weak thunder-bolt. Thus, the coherer No. 1 1A is shifted to a cohered electrically conducting state. Next, the transistor 104C of which the bias voltage has been adjusted in advance by the variable resistor 104A, is for protecting the coherer. When the coherer No. 1 is cohered, the transistor 104C is turned off to interrupt the electric current.

The interruption of current by the transistor 104C is transmitted to the timer circuit 16A and to the decoherer No. 1 11A through a photo coupler to actuate them. The photo coupler is for electrically insulating and protecting the circuits of the subsequent stages. The photo coupler also removes electric noise that causes the circuits in the subsequent stages to malfunction. The coherer No. 1 11A is decohered by the decoherer No. 1 11A, restores its electrically insulated state and becomes ready to receive electromagnetic waves of subsequent lightning.

Effect of the embodiment 1.

This embodiment has proved the validity of the lightning detector that utilizes characteristics specific to the coherer that is insensitive to noise, such as electromagnetic waves (carrier waves) of signals, but that very sharply reacts to impulse disturbed electromagnetic waves such as those of lightning.

Embodiment 2

Described below is an embodiment 2 of the present invention.

Figure 3:
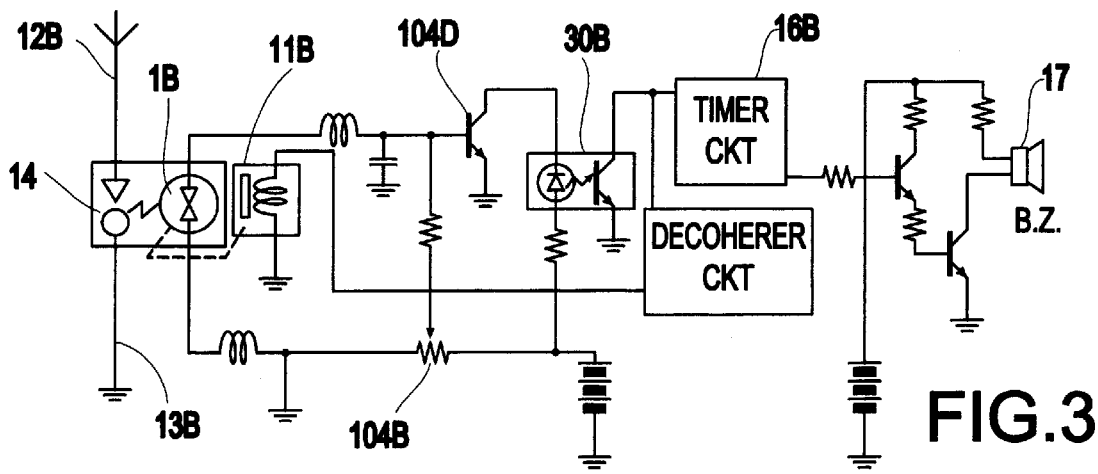
FIG. 3 is a circuit diagram of a second embodiment of the present invention.
Figure 4:
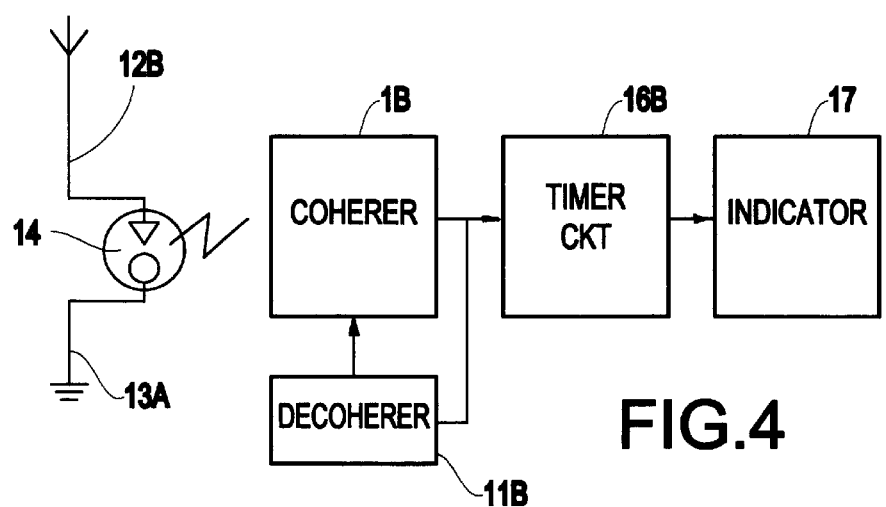
FIG. 4 is a block diagram of the circuit of FIG. 3.
Figure 5:
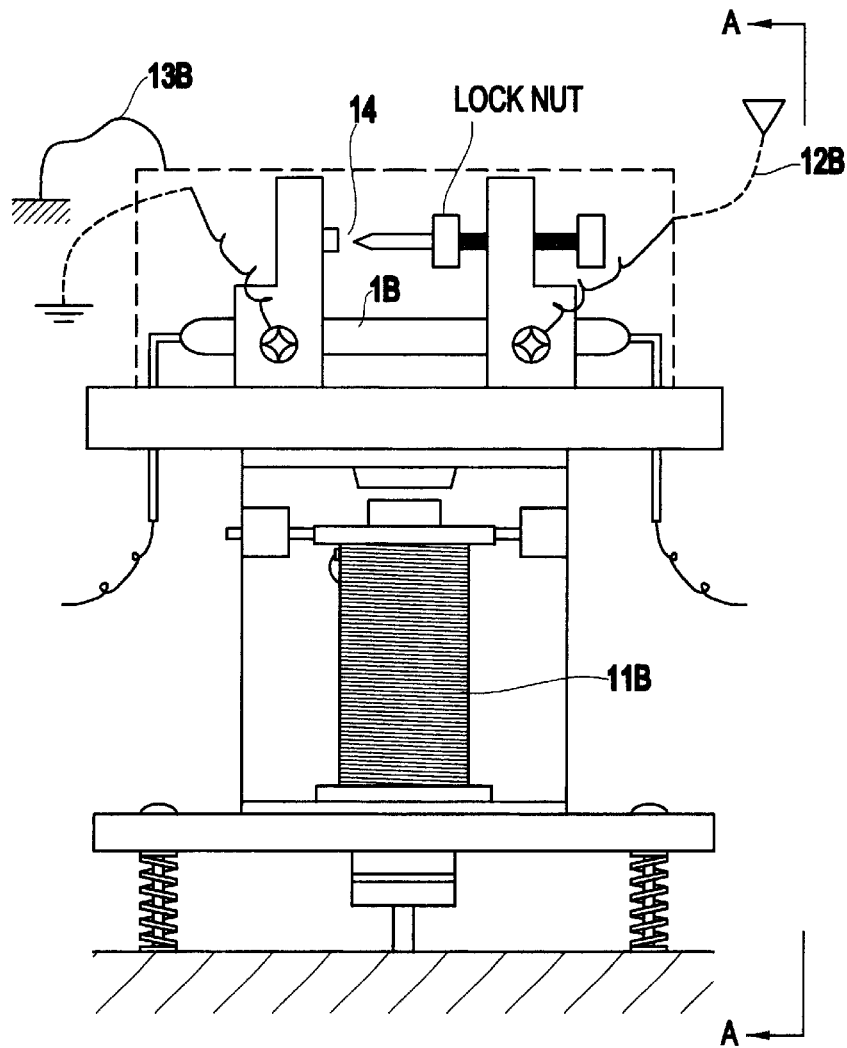
FIG. 5 is a front view illustrating a coherer with a decoherer having a discharge gap.
Figure 6:
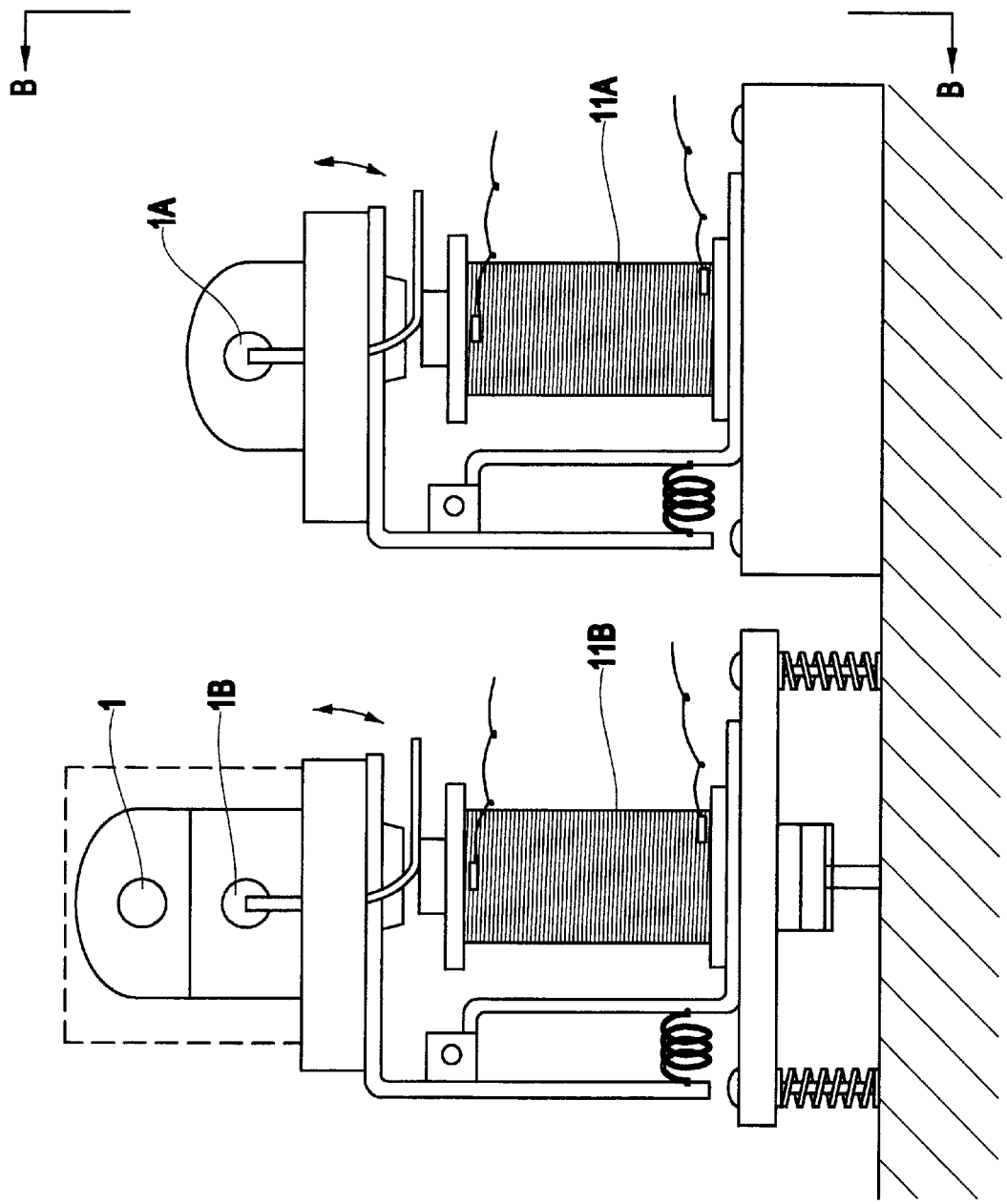
FIG. 6 is a side view illustrating a coherer with a decoherer according to embodiments 3 and 4.
Figure 7:
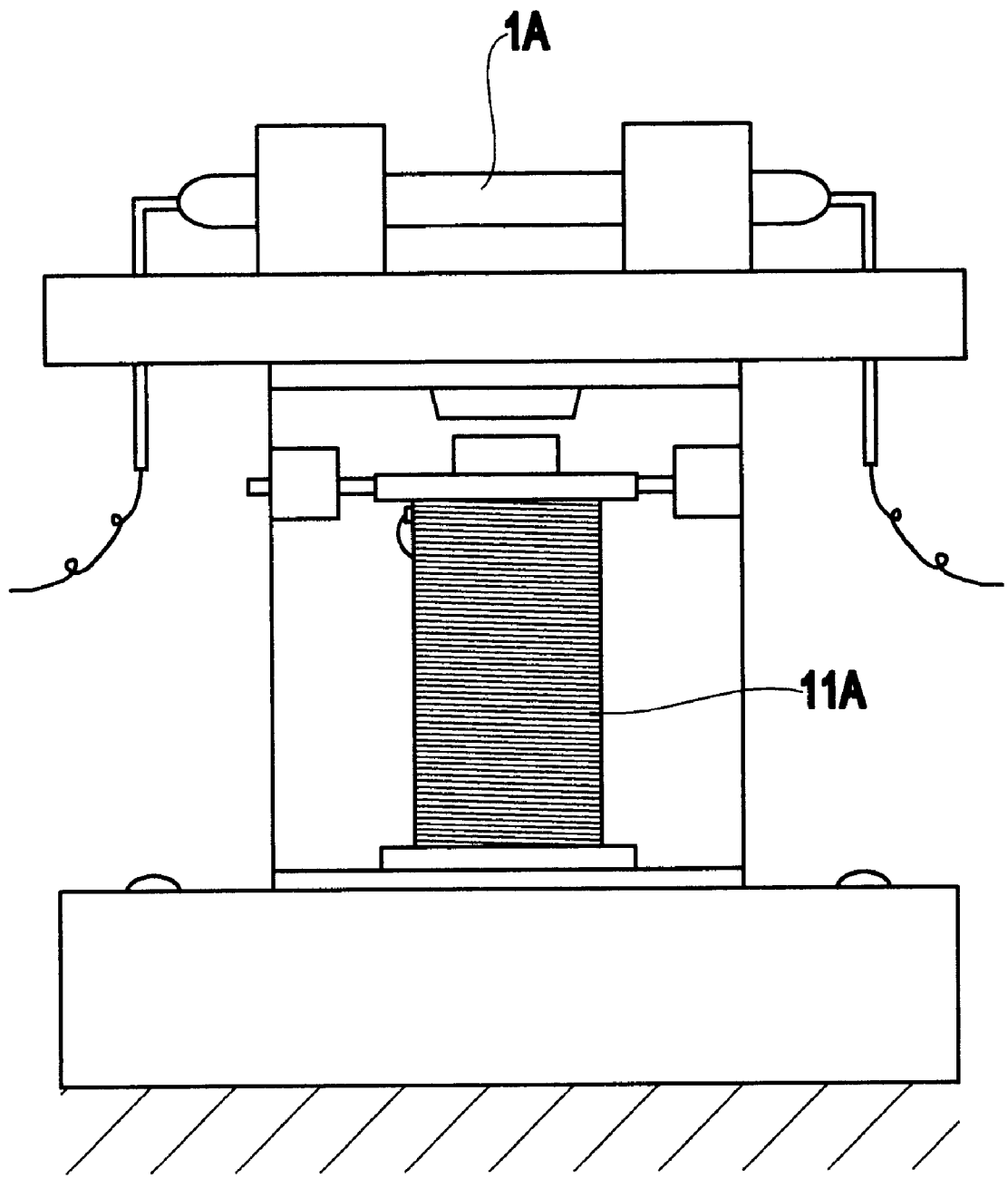
FIG. 7 is a front view illustrating a coherer with a decoherer.

FIG. 3 is a circuit diagram of the embodiment 2 of the invention and FIG. 4 is a block diagram, wherein reference numeral 12B denotes an antenna No. 2 for trapping static discharge and corona discharge just before the thunder-bolt, 13B is earth, 14 is a discharge gap, 18 is a coherer No. 2 for detecting the electric discharge taking place at the discharge gap 14, reference numeral 104D is a transistor that operates according to a change in the voltage applied to the coherer No. 2 1B, reference numeral 104B is a variable resistor for adjusting the bias voltage applied to the transistor 104D, reference numeral 1B denotes a decoherer for giving vibration to the coherer No. 2 to decohere it, and reference numeral 16B is a timer for transmitting the detection of lightning to the indicator for a predetermined period of time.

Near the antenna No. 2 12B, a static discharge or corona discharge occurs on the antenna No. 2 12B due to a rapid change in the static electric field between the atmosphere and the ground just before a thunder-bolt. Therefore, a small spark discharge occurs at the discharge gap 14. The coherer No. 2 1B is cohered due to the electromagnetic waves produced by the spark discharge. Then, the transistor 104D of which the bias voltage is adjusted by the variable resistor 104B is turned off, to actuate the timer circuit 16B and the decoherer 11B. The timer circuit 16B actuates the indicator for a predetermined period of time. The coherer No. 2 1B is decohered by the decoherer 11B to be ready for the next occurrence of electric discharge.

Effect of the embodiment 2.

The device according to the second embodiment traps a sharp change in the static electric field between space and ground just before the thunder-bolt to highly reliably detect (forecast) the lightning.

Embodiment 3

Described below is an embodiment 3 of the invention.

Figure 8:
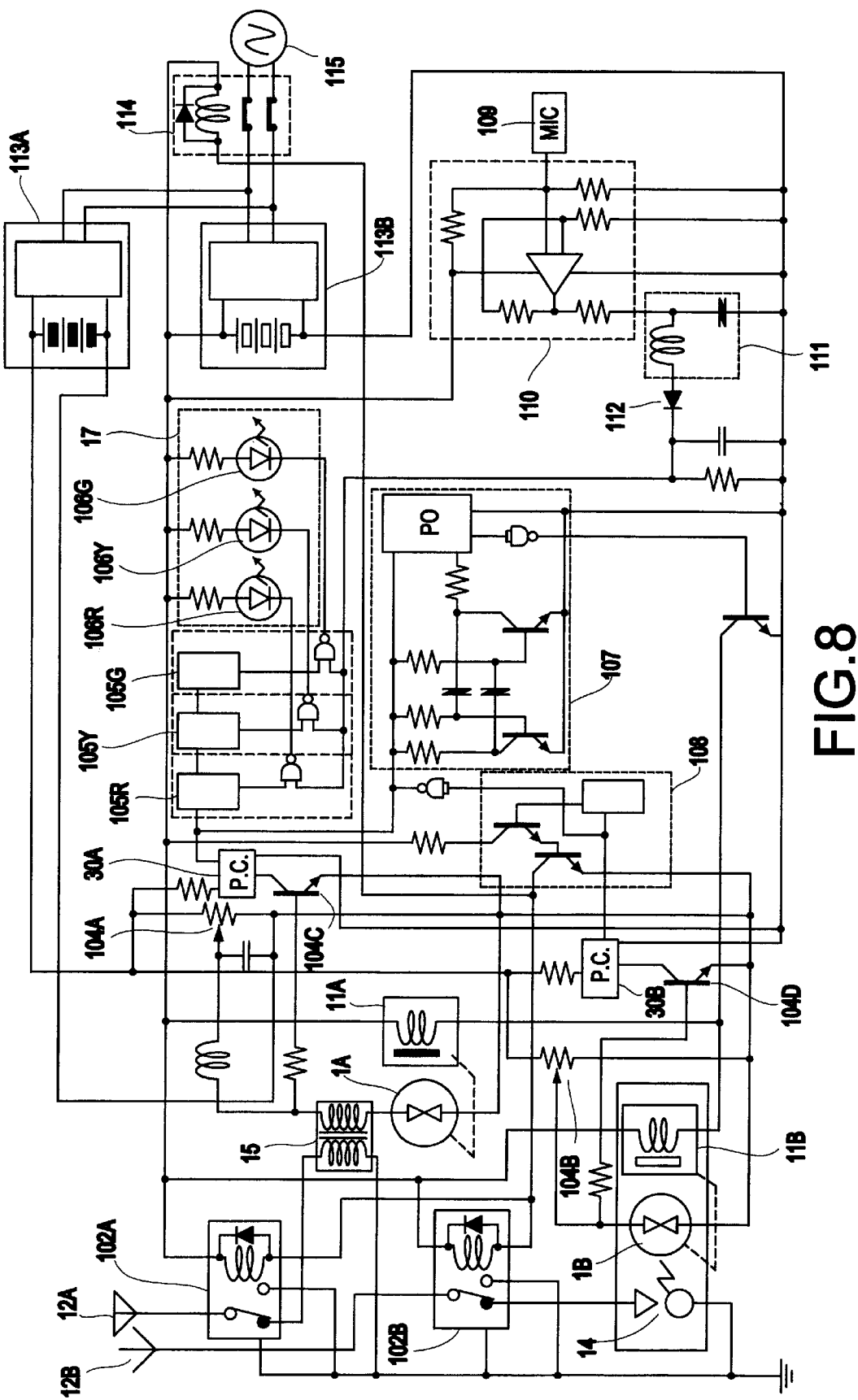
FIG. 8 is a circuit diagram of a third embodiment of the present invention.
Figure 9:
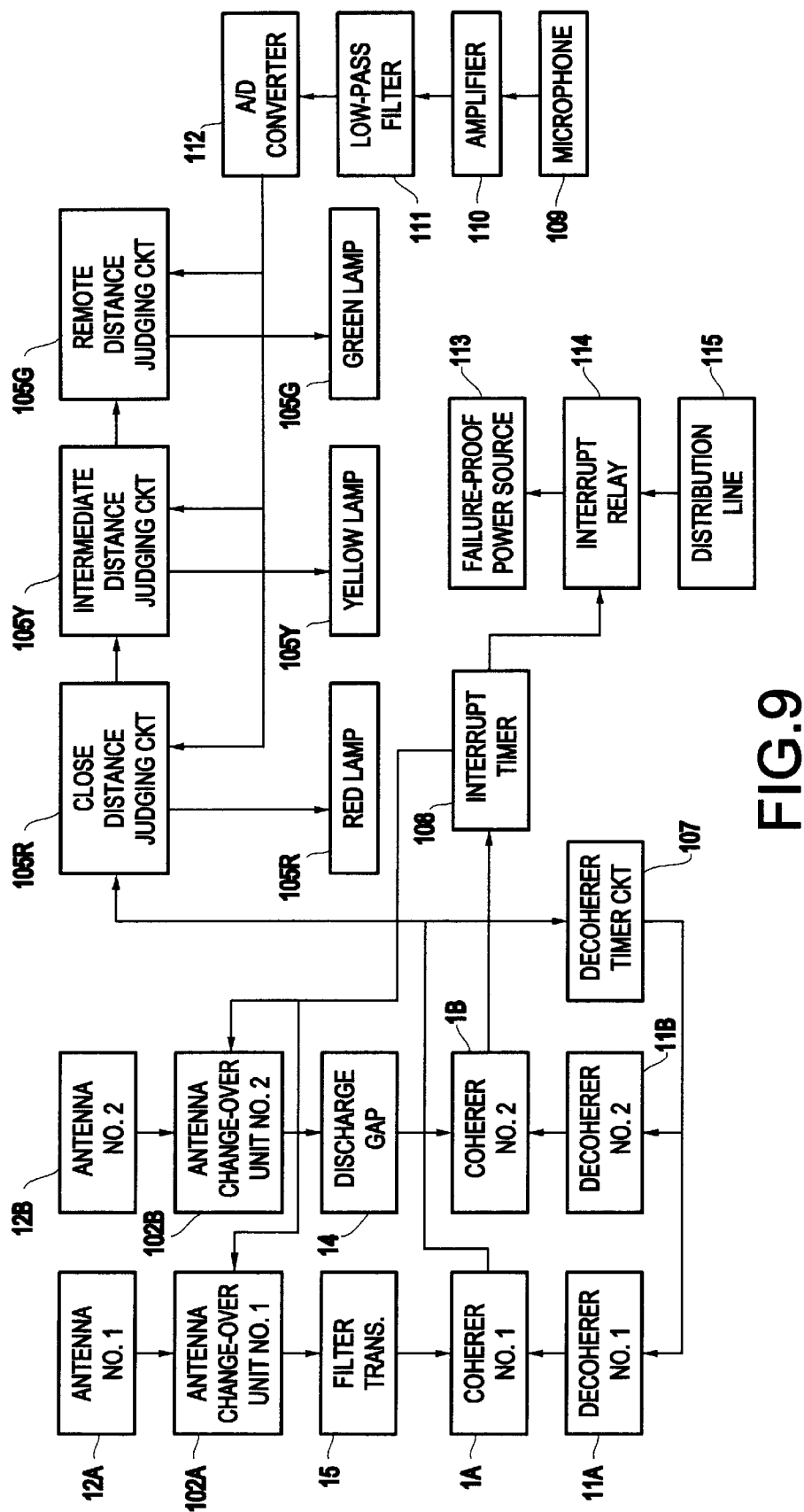
FIG. 9 is a block diagram of the circuit of Fig. 8.
Figure 10:
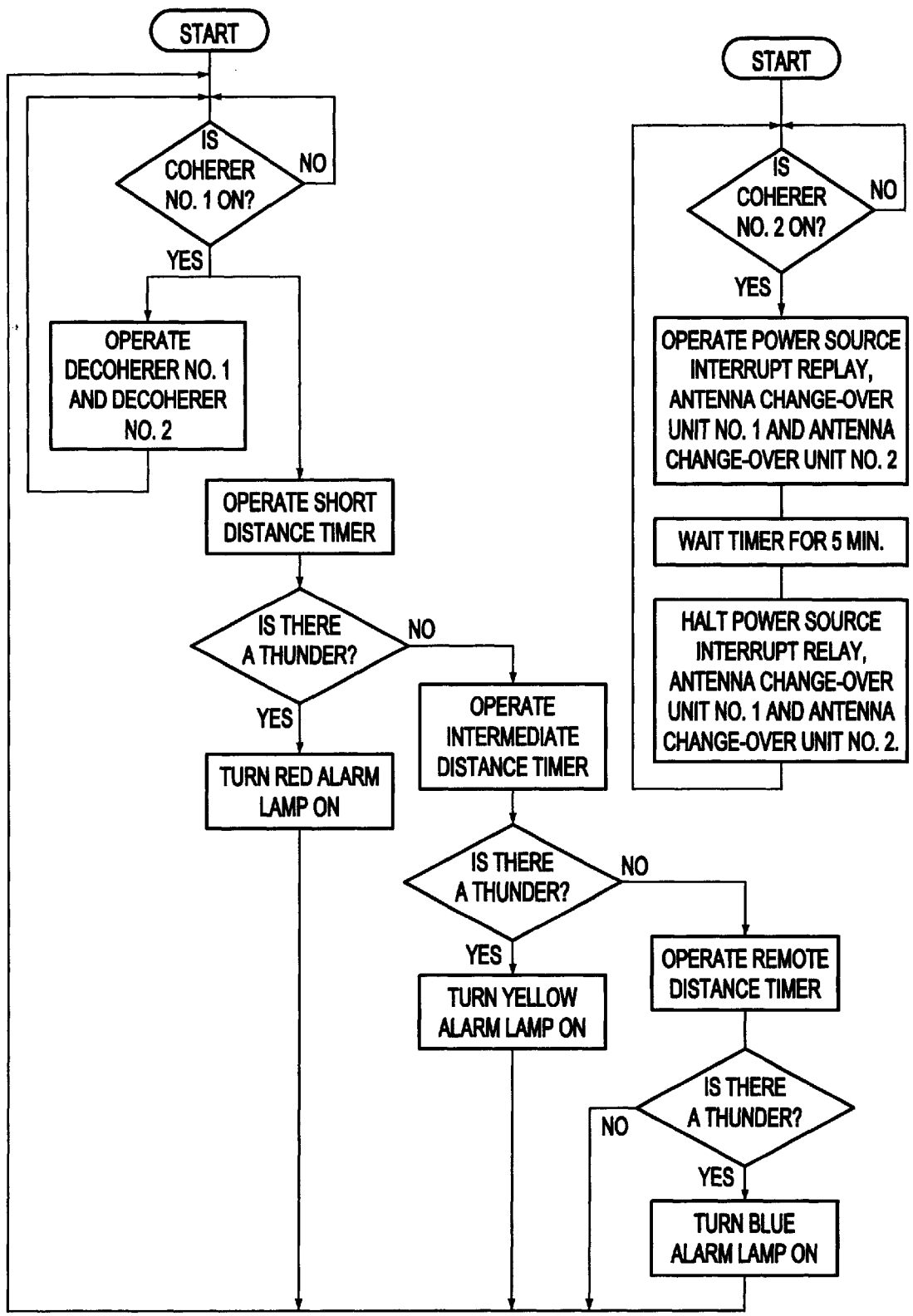
FIG. 10 is a flowchart illustrating the operation of the invention.

FIG. 8 is a circuit diagram of the embodiment 3 of the invention, FIG. 9 is a block diagram thereof, and FIG. 10 is a flowchart of the operation. In addition to those elements of the above-mentioned embodiments 1 and 2, there are provided an antenna change-over unit No. 1 102A and an antenna change-over unit No. 2 102B for shutting off the antenna No. 1 12A and the antenna No. 2 12B from the alarm circuit in order to protect the alarm unit from lightning at a close distance. There are further provided a non-directive microphone 109 for detecting thunder, an amplifier 110 for amplifying the signal of the microphone 109, a low-pass filter 111 for improving the selectivity of thunder of a low frequency, a diode 112 for converting AC thunder signals into DC voltages, a close distance judging circuit 105R for judging the thunder-bolt at a close distance based on the timer operated by the turn-off of the transistor 104C and the thunder signal from the diode 112, an intermediate distance judging circuit 105Y for judging the thunder-bolt at an intermediate distance based on the timer that starts operating upon the end of operation of the close distance judging circuit 105R and the thunder signal from the diode 112, a remote distance judging circuit 105G for judging the thunder-bolt at a remote distance based on the timer that starts operating upon the end of operation of the intermediate distance judging circuit 105Y and the thunder signal from the diode 112, red, yellow and green alarm lamps 106R, 106Y and 106G for indicating degrees (static) of danger of a thunder-bolt, a decoherer timer circuit 107 for operating the decoherer A No. 1 and the decoherer B No. 2 by turning the transistor 104C off and turning the transistor 104D off, a power distribution line 115, a power interrupt relay 114, a battery-supported failure-proof power source device 113A for the coherer power source unit and a battery-supported failure-proof power source device 113B for the alarm unit, and an interrupt timer circuit 108 which operates upon the turn off of the transistor 104D and actuates the antenna change-over unit No. 1 102A, antenna change-over unit No. 2 102B and power source interrupt relay 114.

Alarming Operation.

The electromagnetic waves of lightning received by the antenna No. 1 12A are transmitted through the antenna change-over unit No. 1 102A to the filter transformer 15 where high-frequency components are attenuated, and are further transmitted to the coherer No. 1 1A. The coherer No. 1 1A is cohered by the input of electromagnetic waves of lightening. The transistor 104C of which the bias voltage is adjusted through the variable resistor 104A is turned off by the coherer No. 1 1A that is cohered to become conductive, whereby the close distance judging circuit 105R and the decoherer timer circuit 107 start operating.

The close distance judging circuit 105R turns the close distance alarm lamp 106R on when a thunder signal is received from the diode 112 within a timer period. After the timer period has passed, the next intermediate distance judging circuit 105Y starts operating and turns the intermediate distance alarm lamp 106Y on when a thunder signal is received from the diode 112 within the timer period. The remote distance judging circuit 105G, too, operates in the same manner for the remote distance alarm lamp 106G.

The decoherer timer circuit 107 actuates the decoherer No. 1 11A and the decoherer No. 2 11B, and adds mechanical vibration to the coherer No. 1 1A and to the coherer No. 2 1B, so that the coherer returns from the cohered electrically conducting state to the insulation-recovered state to be ready for receiving the electromagnetic waves of subsequent lightning.

Lightning Operation.

When the electrostatic discharge or corona discharge takes place on the antenna No. 2 12B just before the lightning, the discharge current flows through the antenna change-over unit No. 2 102B causing an electric discharge to take place at the discharge gap 14. The coherer No. 2 1B is thus cohered. The transistor 104D of which the bias voltage is adjusted in advance by the variable resistor 104B is turned off depending upon a change-in the state of the coherer No. 2 1B, whereby the interrupt timer circuit 109 starts operating and the above-mentioned decoherer timer circuit 107 starts operating, causing the coherer No. 1 1A and the coherer No. 2 1B to be decohered.

The antenna change-over unit No. 1 102A, the antenna change-over unit No. 2 102B and the power source interrupt relay 114 are operated for a predetermined period of time due to the interrupt timer circuit 109, to prevent the internal circuitry in the detector from being destroyed by violent impulse electromagnetic waves due to lightning at a close distance passing through the antenna No. 1 12A, antenna No. 2 12B and power distribution line 115.

After the passage of the predetermined period of time, the interrupt timer circuit 108 permits the antenna change-over unit No. 1 102A, antenna change-over unit No. 2 102B and power source interrupt relay 114 to return to execute the alarming operation.

Effect of the embodiment 3.

This embodiment enables the detector itself to automatically conduct the lightning to ground in addition to obtaining the effects of the embodiments 1 and 2, and, hence, makes it possible to safely continue the detection of lightning.

Embodiment 4

Figure 11:
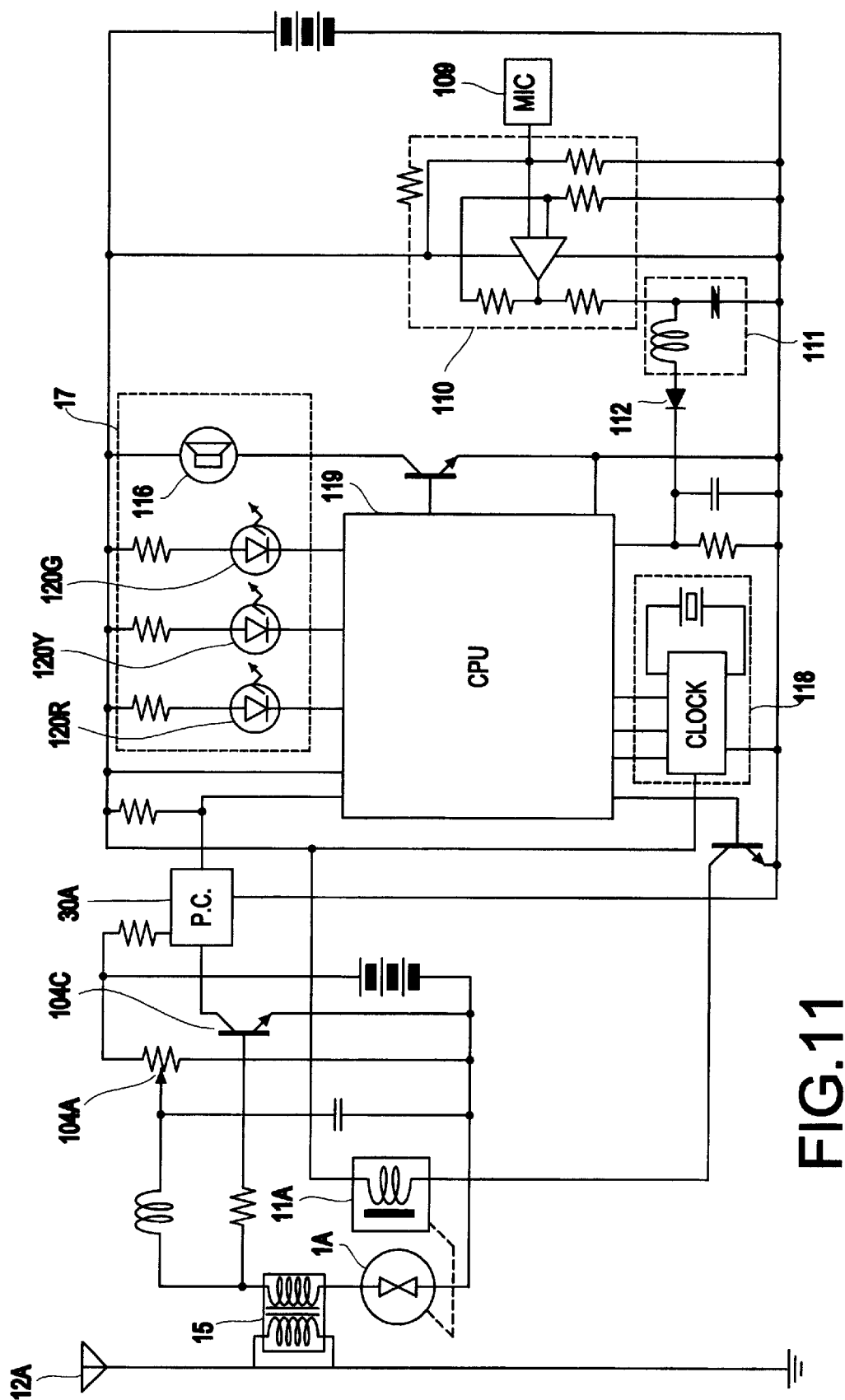
FIG. 11 is a circuit diagram of a fourth embodiment according to the present invention.
Figure 12:
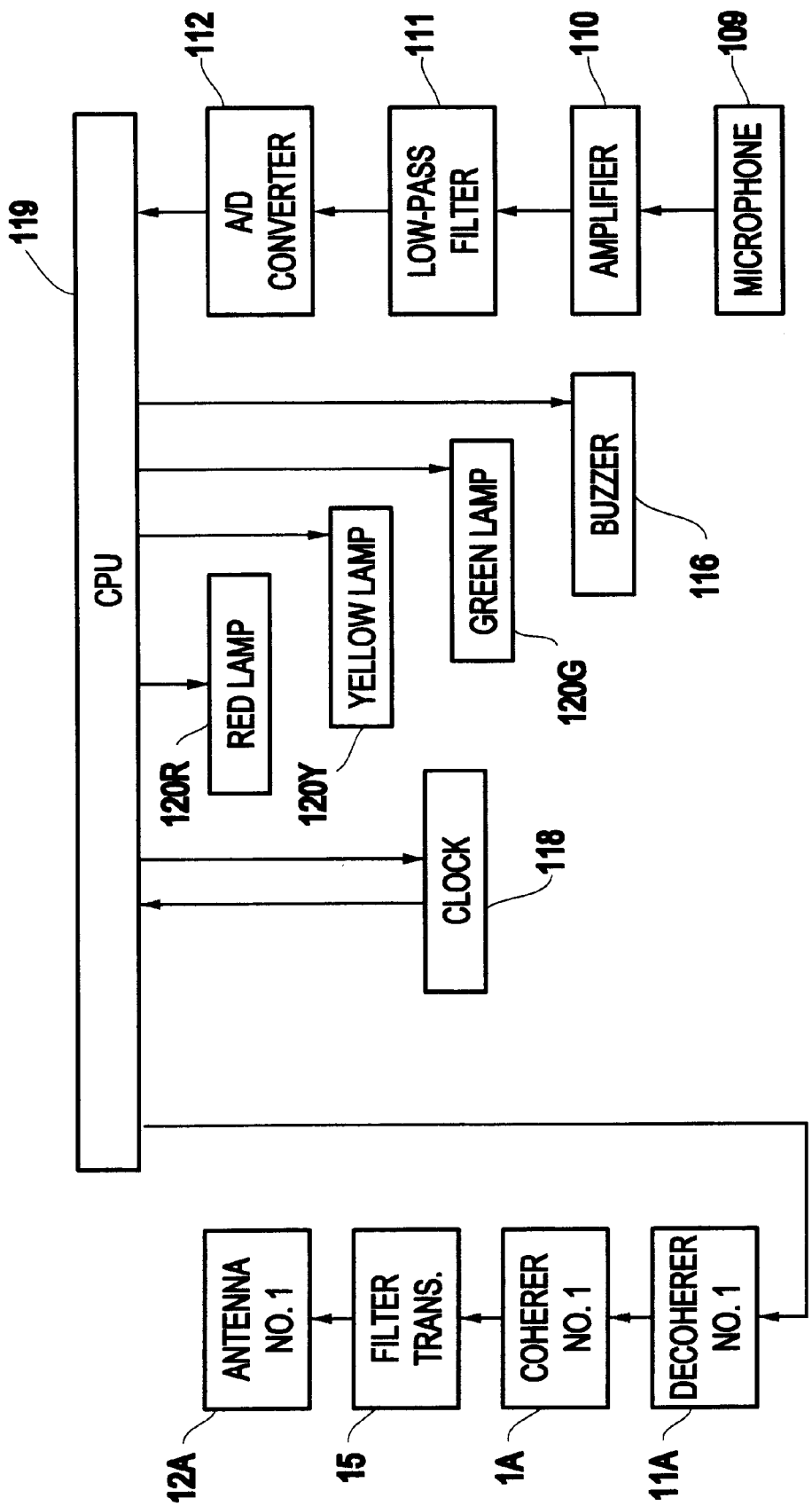
FIG. 12 is a block diagram of the circuit of FIG. 11.
Figure 13:
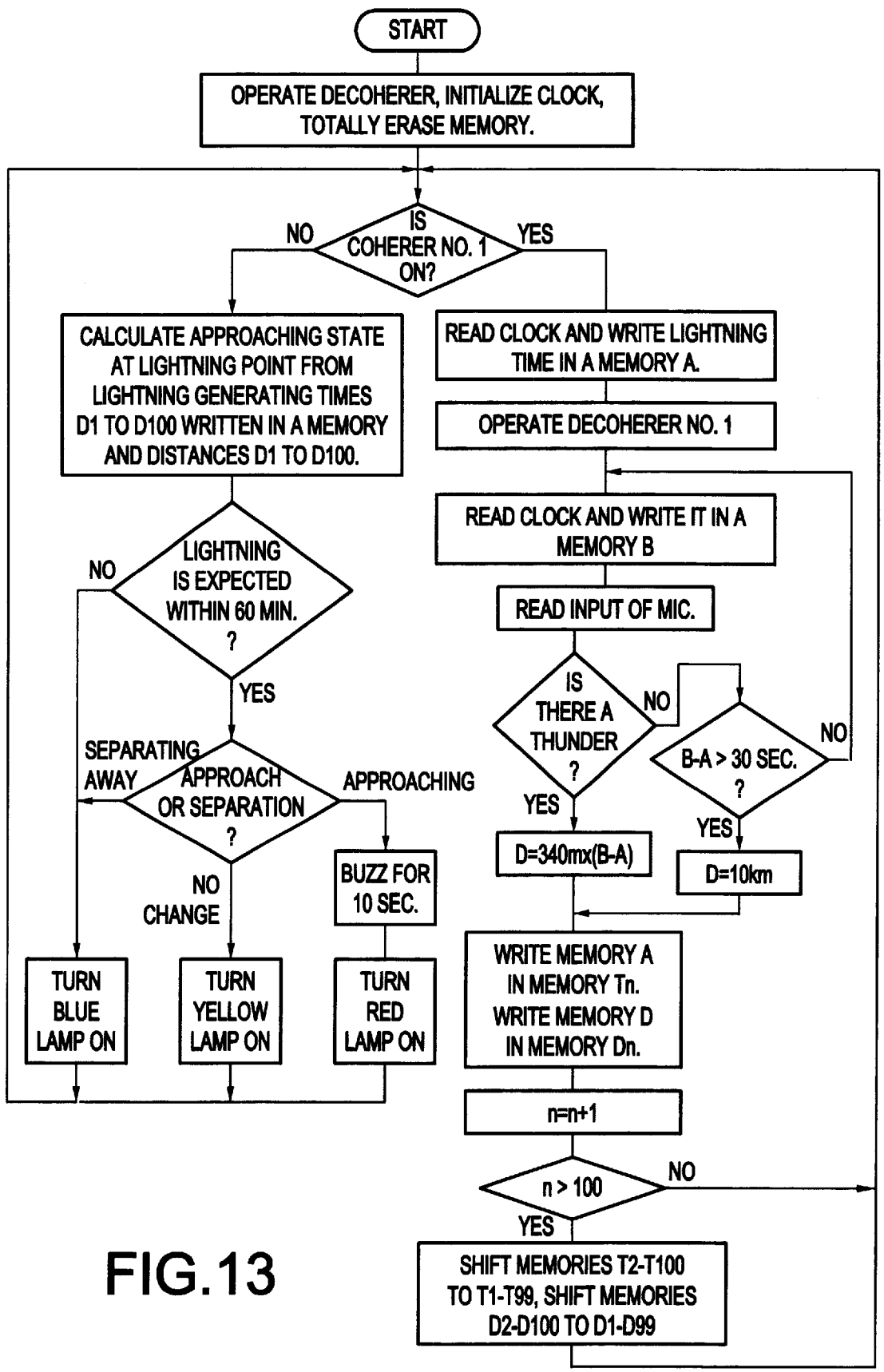
FIG. 13 is a flowchart illustrating the operation.

Described below is an embodiment 4 of the invention of claim 5. FIG. 11 is a circuit diagram of the embodiment 4, FIG. 12 is a block diagram thereof, FIG. 13 is a flowchart of the operation, and FIG. 14 is a diagram schematically illustrating how to judge that the thundercloud is approaching or is moving away.

Figure 14:
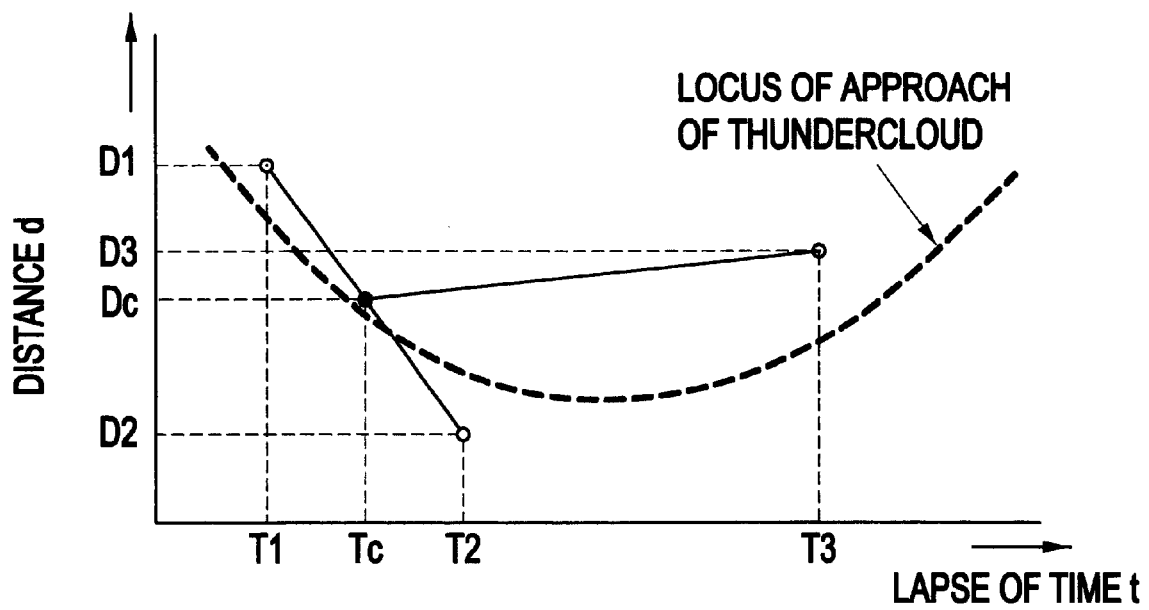
FIG. 14 is a view schematically illustrating how to judge that the thundercloud is approaching or is separating away.

In addition to those elements of the above-mentioned embodiments 1, 2 and 3, there are provided a lamp 120R which indicates that the thunder is approaching, a lamp 120Y which indicates neither the thunder is approaching nor the thunder is separating away, a lamp 120G which indicates that the thunder is separating away, and a CPU 119 which controls the turn-on of lightning danger (dynamic) alarm lamps 120R, 120Y and 120G as shown in a flowchart of FIG. 14 relying upon the input of lightning electromagnetic waves from the photo coupler 30A and upon the input of thunder front the diode 112, and controls the buzzing sound of a buzzer 116. Reference numeral 118 denotes a clock for measuring the passage of time.

Initial Setting.

When the power source is turned on, the CPU 119 operates the decoherer No. 1 11A as an initial setting, resets the passage of time to the clock 118, and erases the contents stored in the memory. When the coherer 1A is in the cohered conducting state, the CPU 119 repeats the initial setting.

Alarming Operation.

The electromagnetic waves of lightning received by the antenna No. 1 12A are transmitted to the filter transistor 15 where high-frequency components are attenuated and are further transmitted to the coherer 1A. The coherer 1A is cohered by the input of electromagnetic waves of lightning.

The transistor 104C of which the bias voltage has been adjusted in advance by the variable resistor 104A is turned off by the coherer 1A that is cohered and is rendered conductive, whereby the CPU judges that the electromagnetic waves of lightning have been received. The CPU reads out the time from the clock, stores it in the internal memory A, and operates the decoherer No. 1 11A to decohere the coherer No. 1 1A.

The CPU waits for the input of a thunder signal from the diode 112 and stores it in the memory B. A distance to the point where the thunder has generated is estimated from the time difference between the time of receiving the lightning electromagnetic waves and the thunder time stored in the memory A and in the memory B, and is stored in the internal memory D. When no thunder signal is input even after having waited for more than 30 seconds, the time difference is set to be 30 seconds, and the distance to the point where the thunder is generated is estimated and is stored in the internal memory D.

The CPU stores the value D in the internal memory D1 and stores the value A in the internal memory T1 as lightning generation hysteresis data. Then, every time when a new lightning electromagnetic wave is detected, the CPU additionally stores them as hysteresis data in the internal memories D2 to D100, T2 to T100. When the detection of lightning electromagnetic waves has exceeded 100 times, the CPU shifts the contents stored in the memories D2 to D100 and T2 to T100 to D1 to D99 and T1 to T99, stores the memory D in the memory D100, and stores the memory A in T100, to store them as the latest lightning generation hysteresis data.

The CPU estimates the approach or separation of the thundercloud from the lightning generation hysteresis data T1 to T100 and D1 to D100 in the memory. In practice, however, the points where lightning is occurring are considerably dispersed as shown in FIG. 14. Described below is how to judge the approach or separation of the thundercloud from these dispersed values.

First, at a moment where the oldest hysteresis distance value D1 is stored in FIG. 14, the CPU waits for the next thunder-bolt. When T2 and D2 are stored at the next generation of a thunder-bolt, the CPU calculates the inclination of a line that connects a point T1, D1 to a point T2, D2 in FIG. 14. When the inclination is (-), the CPU judges that the lightning is approaching and turns the alarm lamp 120R on. When the inclination is near (0), the CPU judges that the lightning is neither approaching nor moving away and turns the alarm lamp 120Y on When the inclination is (+), the CPU judges that the lightning is moving away and turns the alarm lamp 120G on.

When D3 and T3 are stored at the third generation of lightning, the CPU operates average-value points Tc, Dc of T1, T2 and D1, D2. When the inclination of a line connecting these points to the points T3, D3 is (−), the CPU judges that the lightning is approaching and turns the alarm lamp 120R on. When the inclination is nearly 0, the CPU judges that the lightning is neither approaching nor separating away and turns the alarm lamp 120Y on. When the inclination is (+), the CPU judges that the lightning is separating away and turns the alarm lamp 120G on.

Thereafter, every time when lightning newly occurs, the CPU finds an inclination of a line connecting average points Tc, Dc of the two preceding thunder-bolt generation hysteresis data to new points Tn, Dn, and repeats the alarming operation.

Though the indicator was designed to turn on red, yellow and green lamps, so that the degree of danger can be easily comprehended, there can be employed any similar display means. However, that there may be further used an alarming sound, a recording paper, a telemeter automatic emission displayed on CRT, or a combination thereof.

Effect of the embodiment 4.

This embodiment makes it possible to judge and display the degree of danger of a thunder-bolt based on whether the thundercloud is approaching or is moving away, as well as to automatically detect whether the thundercloud is in a lightning range.

When taking a measurement while mounting the device (lightning detector) of this embodiment on a body that moves at a constant speed, it can be presumed that the measurement might be adversely affected due to Doppler effect. This, however, can be corrected by suitable means such as adding or subtracting the moving speed of the device to or from the measurement value.

Embodiment 5

Figure 15:
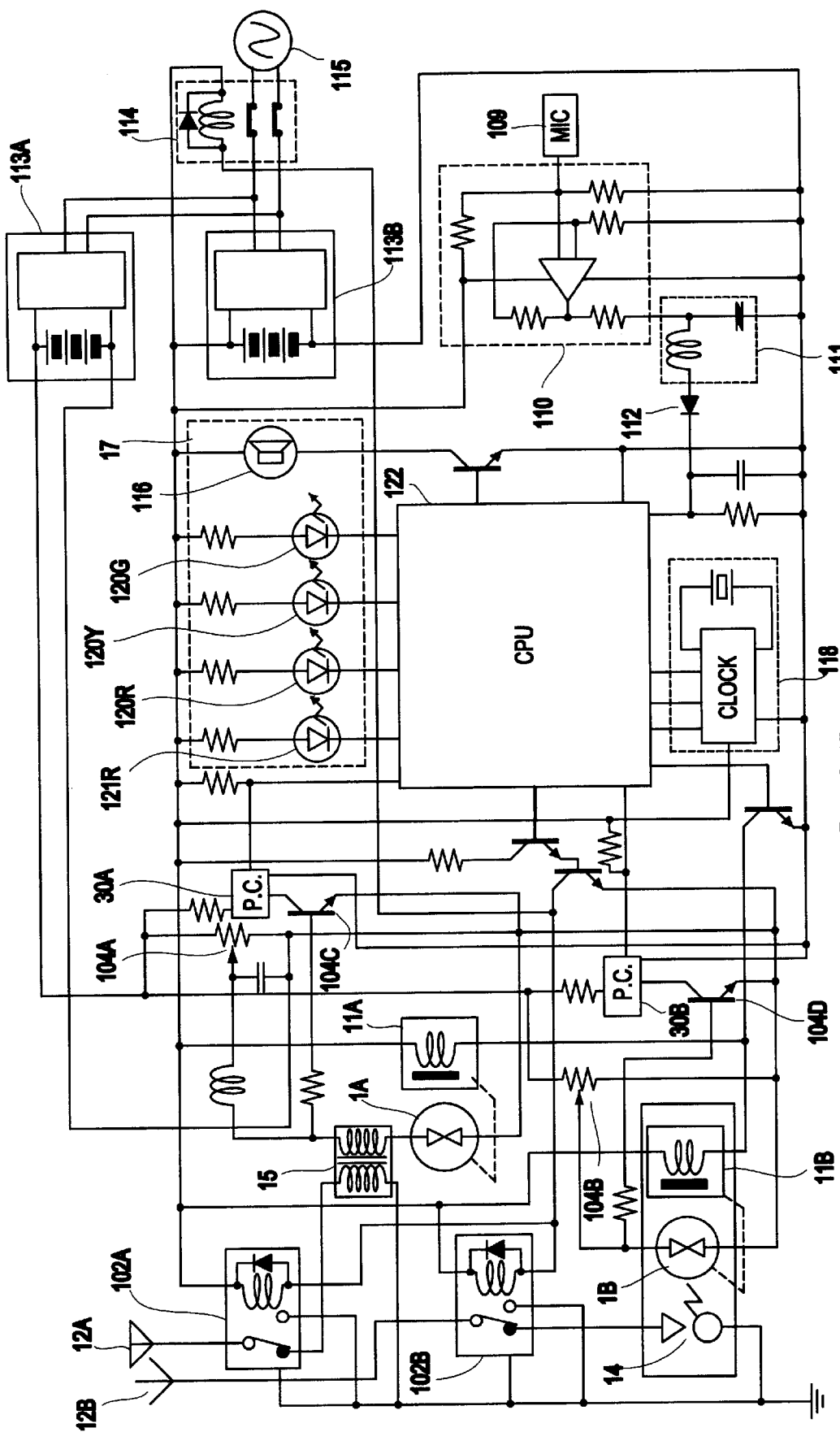
FIG. 15 is a circuit diagram of a fifth embodiment of the present invention.
Figure 16:
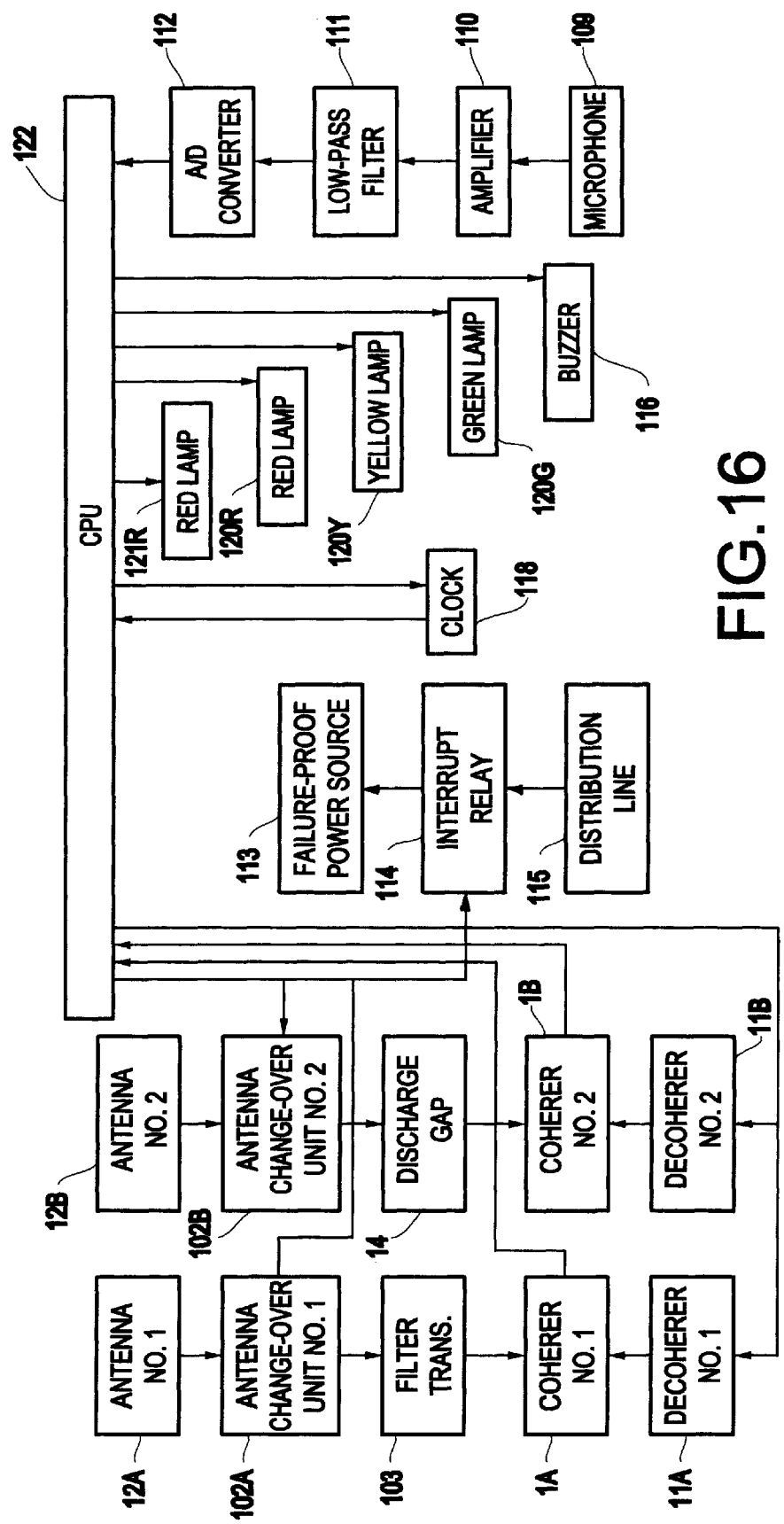
FIG. 16 is a block diagram of the circuit of FIG. 15.

Described below is an embodiment 5 of the invention of claim 5. The embodiment 5 is a combination of the above-mentioned static lightning detector means and the dynamic lightning detector means. FIG. 15 is a circuit diagram of the embodiment 5, FIG. 16 is a block diagram thereof, FIG. 17 is a flowchart illustrating the operation, and FIG. 14 is a diagram schematically illustrating how to judge the approach or separation of the thundercloud.

Figure 17:
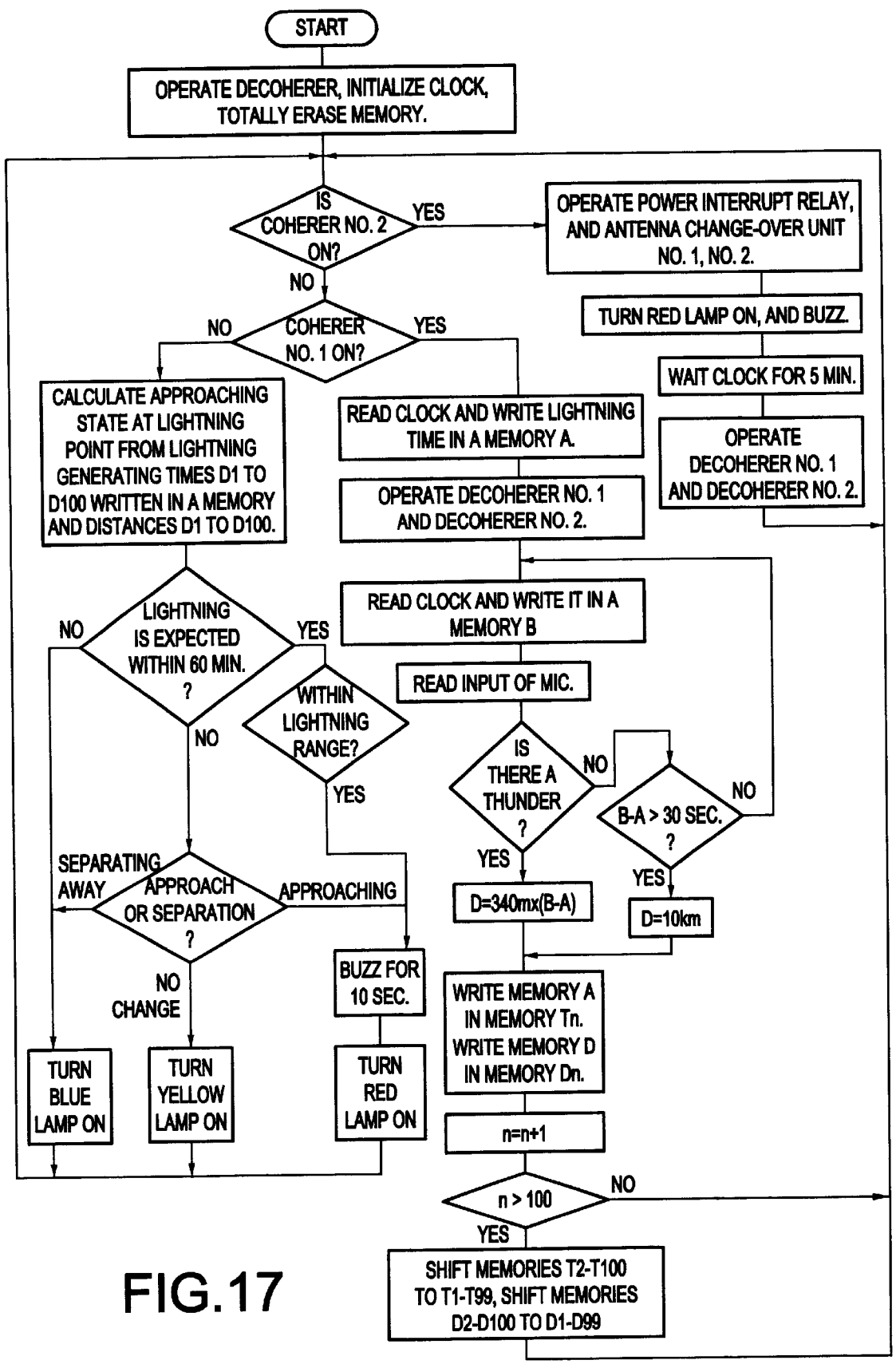
FIG. 17 is a flowchart illustrating the operation.

In addition to those elements of the above-mentioned embodiments 1, 2, 3 and 4, there are provided a lamp 121R for indicating the lightning range, and a CPU 122 which controls the turn-on of lightning danger (dynamic) alarm lamps 120R, 120Y and 120G as shown in a flowchart of FIG. 17 relying upon the input of lightning electromagnetic waves from the photo coupler 30A and photo coupler 30B and upon the input of thunder from the diode 112, controls the turn-on of lightning danger (static) alarm lamp 121R that indicates the lightning range, controls the buzzing sound of the buzzer 116, and controls the antenna change-over unit No. 1 102A, antenna change-over unit No. 2 102B and power source interrupt relay 114. Reference numeral 118 denotes a clock for measuring the passage of time.

Initial Setting.

When the power source is turned on, the CPU 122 operates the decoherer No. 1 11A and the decoherer No. 2 11B as an initial setting, resets the passage of time to the clock, and erases the contents stored in the memory. When the coherer No. 1 1A and the coherer No. 2 1B are cohering, the CPU 122 repeats the initial setting.

Alarming Operation.

The electromagnetic waves of lightning received by the antenna No. 1 12A are transmitted, through the antenna change-over unit No. 1 102A to the filter transistor 15 where high-frequency components are attenuated and are further transmitted to the coherer 1A. The coherer 1A is cohered by the input of electromagnetic waves of lightning.

The transistor 104C of which the bias voltage has been adjusted in advance by the variable resistor 104A is turned off by the coherer 1A that is cohered and is rendered conductive, whereby the CPU judges that the electromagnetic waves of lightning have been received. The CPU reads out the time from the clock, stores it in the internal memory A, and operates the decoherer No. 1 11A and the decoherer No. 2 11B to decohere the coherer No. 1 1A and the coherer No. 2 1B.

The CPU waits for the input of a thunder signal from the diode 112 and stores it in the memory B. A distance to the point where the thunder has been generated is estimated from the time difference between the time of receiving the lightning electromagnetic waves and the thunder time stored in the memory A and in the memory B, and is stored in the internal memory A. When no thunder signal is input even after having waited for more than 30 seconds, the time difference is set to be 30 seconds, and the distance to the point where the thunder is generated is estimated and is stored in the internal memory D.

The CPU stores the value D in the internal memory D1 and stores the value A in the internal memory T1 as lightning generation hysteresis data. Then, every time when a new lightning electromagnetic wave is detected, the CPU additionally stores them as hysteresis data in the internal memories D2 to D100, T2 to T100. When the detection of lightning electromagnetic waves has exceeded 100 times, the CPU shifts the contents stored in the memories D2–D100 and T2–T100 into D1–D99 and T1–T99, stores the memory D in the memory D100, and stores the memory A in T100, to store them as the latest lightning generation hysteresis data.

The CPU estimates the approach or separation of the thundercloud from the lightning generation hysteresis data T1–T100 and D1–D100 in the memory. In practice, however, the points where lightning is occurring are considerably dispersed as shown in FIG. 14. Described below is how to judge the approach or separation of the thundercloud from these dispersed values.

First, when D1 is within the lightning range at a moment where the oldest hysteresis distance value D1 is stored in FIG. 14, the CPU 122 informs of the generation of a thunder-bolt by turning the alarm lamp 121R on and energizing the buzzer 116. When the oldest hysteresis distance value D1 is outside the lightning range, however, the CPU waits for the generation of a next thunder-bolt. When T2 and D2 are stored at the next generation of thunder-bolt, the CPU 122 turns the alarm lamp 121R on and energizes the buzzer 16 provided D2 is within the lightning range. When D1 is outside the lightning range, the CPU 122 calculates the inclination of a line that connects a point T1, D1 to a point T2, D2 in FIG. 14. When the inclination is (−), the CPU judges that the lightning is approaching and turns the alarm lamp 120R on. When the inclination is near (0), the CPU judges that the lightning is neither approaching nor separating away and turns the alarm lamp 120Y on. When the inclination is (+), the CPU so, judges that the lightning is separating away and turns the alarm lamp 120G on.

When D3 and T3 are stored at the third generation of lightning, the CPU turns the alarm lamp 121R on and energizes the buzzer 116 provided D3 is within the lightning range. When D3 is outside the lightning range, the CPU operates average-value points Tc, Dc of T1, T2 and D1, D2.

When the inclination of a line connecting these points to the points T3, D3 is (−), the CPU judges that the lightning is approaching and turns the alarm lamp 120R on. When the inclination is nearly 0, the CPU judges that the lightning is neither approaching nor separating away and turns the alarm lamp 120Y on. When the inclination is (+), the CPU judges that the lightning is separating away and turns the alarm lamp 120G on.

Thereafter, every time when lightning is newly generated, the CPU finds an inclination of a line connecting average points Tc, Dc of the two preceding thunder-bolt generation hysteresis data to new points Tn, Dn, and repeats the alarming operation.

Though the indicator was designed to turn on red, yellow and green lamps, so that the degree of danger can be easily comprehended, there can be employed any similar display means. However, there may be further used an alarming sound, a recording paper, a telemeter automatic emission displayed on CRT, or a combination thereof.

Lightning Operation.

When the electrostatic discharge or corona discharge takes place on the antenna No. 2 12B during the alarming operation, the discharge current flows through the antenna change-over unit No. 2 102B causing an electric discharge to take place at the discharge gap 14. The coherer No. 1 1A is thus cohered.

The transistor 104D of which the bias voltage is adjusted in advance by the variable resistor 104B is turned off due to the coherer No. 2 1B that is adhered and is rendered conductive, and the CPU detects the generation of electric discharge.

The CPU operates the antenna change-over unit No. 1 102A, the antenna change-over unit No. 2 102B and the power source interrupt relay 114, to prevent the internal circuitry in the detector from being destroyed by violent electromagnetic waves due to lightning at a close distance passing through the antenna No. 1 12A, antenna No. 2 12B and power distribution line 115. The CPU further turns the red alarm lamps 120R and 121R on, and intermittently energizes the alarm buzzer 116 to indicate that the lightning is being conducted to ground.

After the passage of the predetermined period of time, the CPU 122 permits the antenna change-over unit No. 1 102A, antenna change-over unit No. 2 102B and power source interrupt relay 114 to return, whereby the coherer No. 1 1A and the coherer No. 2 1B are decohered to resume the alarming operation.

Effect of the embodiment 5.

This embodiment makes it possible to automatically judge and indicate the degree of danger of lightning depending upon the approach or separation of thundercloud and to automatically detect whether the thundercloud is within the lightning range in addition to the effect of the embodiment 4.

When taking a measurement while mounting the device (lightning detector) of this embodiment on a body that moves at a constant speed, it can be presumed that the measurement might be adversely affected due to Doppler effect. This, however, can be corrected by suitable means such as adding or subtracting the moving speed of the device to or from the measured value.

The above-mentioned objects are all accomplished by implementing the present invention. That is, by using a coherer with a decoherer of a relatively simple structure, it is allowed to reliably predict the danger of thunder-bolt without the probability of being struck by lightning.

Further, a plurality of lightnings (electric signals) and thunders (sound signals) due to thunder-bolts at a distance are detected and stored, and at least two pairs of these data are compared to reliably notify to a user the degree of danger of a thunder-bolt by using an indicator.

What is claimed is:

1. A lightning detector comprising:

an antenna;

a coherer with a decoherer;

a low-pass filter installed between the antenna and the coherer;

an indicator operatively coupled to said coherer; and a power source coupled to said filter, the lightning detector for detecting an intensity of impulse electromagnetic waves of not smaller than a predetermined value produced by a thunder-bolt outside a lightning range, and for smaller than a predetermined value produced by a thunder-bolt outside a lightning range, and for producing at least one of an indication and an alarm on an indicator to notify that the thunder-bolt is approaching the lightning range.

2. A lightning detector as set forth in claim 1, wherein the coherer comprises a coherer filled with metal particles or metal particles coated with an oxide film between a pair of electrodes in an insulating tube that is sealed, and the decoherer comprises a decoherer that mechanically vibrates the coherer from an external side.

3. A lightning detector as set forth in claim 2, wherein a plurality of thunder-bolts stronger than a predetermined level are measured and recorded as electromagnetic wave intensity difference $\Delta En$ and sound pressure difference $\Delta Pn$, and moments of inputs of these signals are stored in a storage medium in time series, and wherein a first predetermined color lamp is turned on when a gradient of time difference $\Delta Tn$ of $\Delta En$ and $\Delta Pn$ of when a pair of electric signal and sound signal are input, is (−) over a time of at least m pairs (m is a positive integer), a second predetermined color lamp is turned on when the gradient of time difference $\Delta Tn$ is close to (0) and a third predetermined color lamp is turned on when the gradient of time difference $\Delta Tn$ is (+), to indicate a danger of thunder-bolt.

4. A lightning detector as set forth in claim 2, wherein the coherer includes a lightning circuit for adjusting an aerial discharge gap.

5. A lightning detector as set forth in claim 4, wherein the lightning circuit includes an exclusive coherer for a lightning circuit, which is separate from the coherer for the alarm.

6. A lightning detector as set forth in claim 2, wherein the lightning circuit includes an exclusive coherer for a lightning circuit, which is separate from the coherer for the alarm.

7. A lightning detector as set forth in claim 6, wherein a plurality of thunder-bolts stronger than a predetermined level are measured and recorded as electromagnetic wave intensity difference $\Delta En$ and sound pressure difference $\Delta Pn$, and moments of inputs of these signals are stored in a storage medium in time series, and wherein a first predetermined color lamp is turned on when a gradient of time difference $\Delta Tn$ of $\Delta En$ and $\Delta Pn$ of when a pair of electric signal and sound signal are input, is (−) over a time of at least m pairs (m is a positive integer), a second predetermined color lamp is turned on when the gradient of time difference $\Delta Tn$ is close to (0) and a third predetermined color lamp is turned on when the gradient of time difference $\Delta Tn$ is (+), to indicate a danger of a thunder-bolt.

8. A lightning detector as set forth in claim 2, wherein a plurality of thunder-bolts stronger than a predetermined level are measured and recorded as electromagnetic wave intensity difference ΔEn and sound pressure difference ΔPn, and moments of inputs of these signals are stored in a storage medium in time series, and wherein a first predetermined color lamp is turned on when a gradient of time difference ΔTn of ΔEn and ΔPn of when a pair of electric signal and sound signal are input, is (−) over a time of at least m pairs (m is a positive integer), a second predetermined color lamp is turned on when the gradient of time difference ΔTn is close to (0) and a third predetermined color lamp is turned on when the gradient of time difference ΔTn is (+), to indicate a danger of a thunder-bolt.

9. A lightning detector as set forth in claim 1, wherein the coherer includes a lightning circuit for adjusting an aerial discharge gap.

10. A lightning detector as set forth in claim 9, wherein the lightning circuit includes an exclusive coherer for a lightning circuit, which is separate from the coherer for the alarm.

11. A lightning detector as set forth in claim 10, wherein a plurality of thunder-bolts stronger than a predetermined level are measured and recorded as electromagnetic wave intensity difference ΔEn and sound pressure difference ΔPn, and moments of inputs of these signals are stored in a storage medium in time series, and wherein a first predetermined color lamp is turned on when a gradient of time difference ΔTn of ΔEn and ΔPn of when a pair of electric signal and sound signal are input, is (−) over a time of at least m pairs (m is a positive integer), a second predetermined color lamp is turned on when the gradient of time difference ΔTn is close to (0) and a third predetermined color lamp is turned on when the gradient of time difference ΔTn is (+), to indicate a danger of a thunder-bolt.

12. A lightning detector as set forth in claims 9, wherein a plurality of thunder-bolts stronger than a predetermined level are measured and recorded as electromagnetic wave intensity difference ΔEn and sound pressure difference ΔPn, and moments of inputs of these signals are stored in a storage medium in time series, and wherein a first predetermined color lamp is turned on when a gradient of time difference ΔTn of ΔEn and ΔPn of when a pair of electric signal and sound signal are input, is (−) over a time of at least m pairs (m is a positive integer), a second predetermined color lamp is turned on when the gradient of time difference ΔTn is close to (0) and a third predetermined color lamp is turned on when the gradient of time difference ΔTn is (+), to indicate a danger of a thunder-bolt.

13. A lightning detector as set forth in claim 9, wherein a plurality of thunder-bolts stronger than a predetermined level are measured and recorded as electromagnetic wave intensity difference ΔEn and sound pressure difference ΔPn, and moments of inputs of these signals are stored in a storage medium in time series, and wherein a first predetermined color lamp is turned on when a gradient of time difference ΔTn of ΔEn and ΔPn of when a pair of electric signal and sound signal are input, is (−) over a time of at least m pairs (m is a positive integer), a second predetermined color lamp is turned on when the gradient of time difference ΔTn is close to (0) and a third predetermined color lamp is turned on when the gradient of time difference ΔTn is (+), to indicate a danger of a thunder-bolt.

14. A lightning detector as set forth in claim 1, further comprising a lightning circuit which includes an exclusive coherer for a lightning circuit, which is separate from the coherer for the alarm.

15. A lightning detector as set forth in claim 14, wherein a plurality of thunder-bolts stronger than a predetermined level are measured and recorded as electromagnetic wave intensity difference ΔEn and sound pressure difference ΔPn, and moments of inputs of these signals are stored in a storage medium in time series, and wherein a first predetermined color lamp is turned on when a gradient of time difference ΔTn of ΔEn and ΔPn of when a pair of electric signal and sound signal are input, is (−) over a time of at least m pairs (m is a positive integer), a second predetermined color lamp is turned on when the gradient of time difference ΔTn is close to (0) and a third predetermined color lamp is turned on when the gradient of time difference ΔTn is (+), to indicate a danger of a thunder-bolt.

16. A lightning detector as set forth in claim 1, wherein a plurality of thunder-bolts stronger than a predetermined level are measured and recorded as electromagnetic wave intensity difference ΔEn and sound pressure difference ΔPn, and moments of inputs of these signals are stored in a storage medium in time series, and wherein a first predetermined color lamp is turned on when a gradient of time difference ΔTn of ΔEn and ΔPn of when a pair of electric signal and sound signal are input, is (−) over a time of at least m pairs (m is a positive integer), a second predetermined color lamp is turned on when the gradient of time difference ΔTn is close to (0) and a third predetermined color lamp is turned on when the gradient of time difference ΔTn is (+), to indicate a danger of a thunder-bolt.

17. A lightning detector comprising:

an antenna;

a coherer in communication with the antenna that detects an intensity of impulse electromagnetic waves not smaller than a predetermined value produced by a thunder-bolt outside a lightning range; and an indicator operatively coupled to the coherer, wherein the indicator produces at least one of an indication and an alarm to notify that the thunder-bolt is approaching the lightning range.

18. The detector of claim 17, further comprising a decoherer operatively coupled to the coherer.

19. The detector of claim 18, further comprising:

a low-pass filter between the antenna and the coherer; and a power source coupled to the indicator.

20. A lightning detector comprising:

a coherer means for detecting an intensity of impulse electromagnetic waves not smaller than a predetermined value produced by a thunder-bolt outside a lightning range; and an indicator means for producing at least one of an indication and an alarm to notify that the thunder-bolt is approaching the lightning range.

* * * * *